US012812553B2

(12) United States Patent
Kiilerich Pratas et al.

(10) Patent No.: US 12,812,553 B2
(45) Date of Patent: Nov. 24, 2026

(54) MPE ASSISTANCE IN TELECOMMUNICATION SYSTEMS

(71) Applicant: Nokia Technologies Oy, Espoo (FI)

(72) Inventors: Nuno Manuel Kiilerich Pratas, Gistrup (DK); Simon Svendsen, Aalborg (DK); Samantha Caporal Del Barrio, Aalborg (DK); Sari Kaarina Nielsen, Espoo (FI); Benny Vejlgaard, Gistrup (DK)

(73) Assignee: Nokia Solutions and Networks Oy, Espoo (FI)

( * ) Notice: Subject to any disclaimer, the term of this patent is extended or adjusted under 35 U.S.C. 154(b) by 909 days.

(21) Appl. No.: 17/762,291

(22) PCT Filed: Aug. 24, 2020

(86) PCT No.: PCT/EP2020/073624
§ 371 (c)(1),
(2) Date: Mar. 21, 2022

(87) PCT Pub. No.: WO2021/052716
PCT Pub. Date: Mar. 25, 2021

(65) Prior Publication Data

US 2023/0031232 A1 Feb. 2, 2023

(30) Foreign Application Priority Data

Sep. 20, 2019 (GB) ..................................... 1913562

(51) Int. Cl.
*H04W 52/18* (2009.01)
*H04W 24/10* (2009.01)

(52) U.S. Cl.
CPC ........... *H04W 52/18* (2013.01); *H04W 24/10* (2013.01)

(58) Field of Classification Search
CPC .. H04W 52/18; H04W 24/10; H04W 72/0473
See application file for complete search history.

(56) References Cited

U.S. PATENT DOCUMENTS

| | | | | |
|---|---|---|---|---|
| 10,893,488 | B2 * | 1/2021 | Khawand | H04W 52/367 |
| 2012/0178494 | A1 * | 7/2012 | Haim | H04W 52/365 455/522 |

(Continued)

FOREIGN PATENT DOCUMENTS

| | | | |
|---|---|---|---|
| WO | 2021052716 | A1 | 3/2021 |

OTHER PUBLICATIONS

"Mitigating Radio Link Failures due to MPE on FR2"; 3GPP TSG-RAN WG4 Meeting #92; R4-1910278; Nokia, Nokia Shanghai Bell; Ljubljana, Slovenia; Aug. 26-30, 2019; 5 pgs.

*Primary Examiner* — Yuwen Pan
*Assistant Examiner* — Fatuma G Sherif

(57) ABSTRACT

An apparatus, method and computer program is described comprising: detecting an occurrence of a maximum permissible exposure event; and reporting maximum permissible exposure assistance information in response to the detection of the occurrence of the maximum permissible exposure event, wherein reporting the maximum permissible exposure assistance information comprises: generating a scheduled report in the event that a periodic scheduling override condition is invalid, wherein the scheduled report is sent when a first time period expires; and generating an unscheduled report in the event that the periodic scheduling override condition is valid, wherein the unscheduled report is sent without waiting for the first time period to expire.

20 Claims, 11 Drawing Sheets

(56) References Cited

U.S. PATENT DOCUMENTS

| | | | | |
|---|---|---|---|---|
| 2018/0167897 | A1* | 6/2018 | Sampath | H04W 52/367 |
| 2019/0261289 | A1 | 8/2019 | Raghavan et al. | |
| 2022/0256472 | A1* | 8/2022 | Lagnado | G06F 1/3231 |
| 2022/0256473 | A1* | 8/2022 | Kiilerich Pratas | H04W 52/367 |
| 2022/0322247 | A1* | 10/2022 | Sun | H04W 52/365 |

* cited by examiner

MPE ASSISTANCE IN TELECOMMUNICATION SYSTEMS

CROSS-REFERENCE TO RELATED APPLICATION

This application is the National Stage of, and therefore claims the benefit of, International Application No. PCT/EP2020/073624 filed on Aug. 24, 2020, entitled "MPE ASSISTANCE IN TELECOMMUNICATION SYSTEMS," which was published in English under International Publication Number WO 2021/052716 on Mar. 25, 2021, which claims priority to GB Application No. 1913562.3 filed on Sep. 20, 2019. The above applications are commonly assigned with this National Stage application and are incorporated herein by reference in their entirety.

FIELD

The present specification relates to mobile communication systems, in particular to the use of mobile communication systems in accordance with exposure guidelines.

BACKGROUND

Exposure guidelines for communication systems are known. Such exposure guidelines may be expressed relative to specific absorption rate (SAR) or maximum permissible exposure (MPE). Although developments have been made, there remains scope for further developments in this field.

SUMMARY

In a first aspect, this specification describes an apparatus (e.g. an user device, or an apparatus implemented at a user device) comprising: means for detecting an occurrence of a maximum permissible exposure event (e.g. when a user device is at a distance less than a minimum safety distance from a user); means for reporting (e.g. to a network element) maximum permissible exposure assistance information in response to the detection of the occurrence of the maximum permissible exposure event, wherein the means for reporting the maximum permissible exposure assistance information is configured to: generate a scheduled report in the event that a periodic scheduling override condition is invalid, wherein the scheduled report is sent when a first time period expires; and generate an unscheduled report in the event that the periodic scheduling override condition is valid, wherein the unscheduled report is sent without waiting for the first time period to expire. A first timer may be provided for monitoring said first time period (e.g. the first time period may be the period of the first timer).

Some example embodiments further comprise means for determining a severity of the detected maximum permissible exposure event. For example, some example embodiments further comprise means for setting the periodic scheduling override condition to be valid in the event that the detected maximum permissible exposure event is determined to have a high severity. The detected maximum permissible exposure event may be determined to have a high severity in the event that a duty cycle reduction required to address said exposure event is above a threshold or in the event that power backoff requirements are above a threshold.

Some example embodiments further comprise means for monitoring an ongoing maximum permissible exposure event (e.g. using a second timer). Some example embodiments further comprise means for reporting that the maximum permissible exposure event has ended in the event that the maximum permissible exposure event ends before a second time period expires. The second time period may be the same, or may be different, to the first time period referred to above.

Some example embodiments further comprise a first timer for monitoring said first time period. Thus, for example, the first time period may be the period of the first timer. Some example embodiments further comprise a second timer for monitoring the second time period referred to above. The second time period may be same as the first time period, but this is not essential to all example embodiments. For example, the second time period may be shorter than the first. The first and second timers may be implemented using the same timer apparatus, or using separate timer apparatus.

Some example embodiments further comprise means for indicating (e.g. by communication with the relevant network, base station, node B etc.) that the apparatus (e.g. the relevant user device) is capable of providing maximum permissible exposure assistance information.

Some example embodiments further comprise means for triggering a power backoff in response to the maximum permissible exposure event. Alternatively, or in addition, some example embodiments further comprise means for triggering a duty cycle adjustment (or a duty cycle limit) in response to the maximum permissible exposure event. The power backoff and/or the duty cycle limit may be triggered in order to meet MPE regulation requirements.

Some example embodiments further comprise means for reconfiguring user device protocols to enable maximum permissible exposure assistance information to be communicated between a user device and a network element.

The said maximum permissible exposure assistance information may be provided as part of a modified L3-based UE assistance signalling procedure. For example, said signalling procedure may include: establishing a connection; exchanging capabilities; and device reconfiguration.

In a second aspect, this specification describes an apparatus (e.g. a network node, such as a base station and gNB or a device or system in communication with such as node) comprising: means for detecting (e.g. at a network element or similar device or system) a maximum permissible exposure event report (e.g. received from a user device or from a device or system in communication with one or more user devices); means for determining whether the detected maximum permissible exposure report is a scheduled report or an unscheduled report (e.g. based on whether the report is received with an expected periodicity); means for determining whether one or more time periods (e.g. as implemented by one or more timers) of the maximum permissible so exposure event protocol should be updated in the event the detected maximum permissible exposure event report is determined to be an unscheduled report, in order to reduce the instances of unscheduled reports; and means for adjusting uplink resources (e.g. triggering duty cycle adjustments and/or power back-off in response to the MPE event) to meet maximum permissible exposure power backoff requirements.

Some example embodiments further comprise means for storing maximum permissible exposure event statistics on receipt of a maximum permissible exposure event report.

Some example embodiments further comprise means for receiving an indication that a remote user device is capable of providing maximum permissible exposure related assistance information.

Some example embodiments further comprise means for defining a first timer start time for a user device, wherein said scheduled report is sent by said user device to said apparatus in the event of the expiry of said first timer. The means for defining a first timer start time may define first timer start times for each of a plurality of user devices (e.g. different user devices of the plurality may have different first timer start times).

Some example embodiments further comprise means for reconfiguring user device protocols to enable maximum permissible exposure assistance information to be communicated between a user device and a network element.

The said maximum permissible exposure assistance information may be provided as part of a modified L3-based UE assistance signalling procedure. For example, said signalling procedure may include: establishing a connection; exchanging capabilities; and device reconfiguration.

In a third aspect, this specification describes a method comprising: detecting an occurrence of a maximum permissible exposure event; and reporting maximum permissible exposure assistance information in response to the detection of the occurrence of the maximum permissible exposure event, wherein reporting the maximum permissible exposure assistance information comprises: generating a scheduled report in the event that a periodic scheduling override condition is invalid, wherein the scheduled report is sent when a first time period expires; and generating an unscheduled report in the event that the periodic scheduling override condition is so valid, wherein the unscheduled report is sent without waiting for the first time period to expire.

The method may further comprise determining a severity of the detected maximum permissible exposure event and setting the periodic scheduling override condition to be valid in the event that the detected maximum permissible exposure event is determined to have a high severity.

The method may further comprise monitoring an ongoing maximum permissible exposure event and reporting that the maximum permissible exposure event has ended in the event that the maximum permissible exposure event ends before a second time period expires.

In a fourth aspect, this specification describes a method comprising: detecting a maximum permissible exposure event report; determining whether the detected maximum permissible exposure report is a scheduled report or an unscheduled report; determining whether one or more time periods of the maximum permissible exposure event protocol should be updated in the event that the detected maximum permissible exposure event report is determined to be an unscheduled report, in order to reduce the instances of unscheduled reports; and adjusting uplink resources to meet maximum permissible exposure power backoff requirements.

The method may further comprise storing maximum permissible exposure event statistics on receipt of a maximum permissible exposure event report.

The method may further comprise defining a first timer start time for a user device, wherein said scheduled report is sent by said user device in the event of the expiry of said first timer. Example embodiments may further comprise defining first timer start times for each of a plurality of user devices.

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer readable medium comprising program instructions stored thereon for performing at least the following: detecting an occurrence of a maximum permissible exposure event; and reporting maximum permissible exposure assistance information in response to the detection of the occurrence of the maximum permissible exposure event, wherein reporting the maximum permissible exposure assistance information comprises: generating a scheduled report in the event that a periodic scheduling override condition is invalid, wherein the scheduled report is sent when a first time period expires; and generating an unscheduled report in the event that the periodic scheduling override condition is valid, wherein the unscheduled report is sent without waiting for the first time period to expire.

In an eighth aspect, this specification describes a computer readable medium comprising program instructions stored thereon for performing at least the following: detecting a maximum permissible exposure event report; determining whether the detected maximum permissible exposure report is a scheduled report or an unscheduled report; determining whether one or more time periods of the maximum permissible exposure event protocol should be updated in the event that the detected maximum permissible exposure event report is determined to be an unscheduled report, in order to reduce the instances of unscheduled reports; and adjusting uplink resources to meet maximum permissible exposure power backoff requirements.

In a ninth aspect, this specification describes a computer program comprising instructions for causing an apparatus to perform at least the following: detecting an occurrence of a maximum permissible exposure event; and reporting maximum permissible exposure assistance information in response to the detection of the occurrence of the maximum permissible exposure event, wherein reporting the maximum permissible exposure assistance information comprises: generating a scheduled report in the event that a periodic scheduling override condition is invalid, wherein the scheduled report is sent when a first time period expires; and generating an unscheduled report in the event that the periodic scheduling override condition is valid, wherein the unscheduled report is sent without waiting for the first time period to expire.

In a tenth aspect, this specification describes a computer program comprising instructions for causing an apparatus to perform at least the following: detecting a maximum permissible exposure event report; determining whether the detected maximum permissible exposure report is a scheduled report or an unscheduled report; determining whether one or more time periods of the maximum permissible exposure event protocol should be updated in the event that the detected maximum permissible exposure event report is determined to be an unscheduled report, in order to reduce the instances of unscheduled reports; and adjusting uplink resources to meet maximum permissible exposure power backoff requirements.

In an eleventh aspect, this specification describes an apparatus comprising: at least one processor; and at least one memory including computer program code which, when executed by the at least one processor, causes the apparatus to: detect an occurrence of a maximum permissible exposure event; and report maximum permissible exposure assistance information in response to the detection of the occurrence of the maximum permissible exposure event, wherein reporting the maximum permissible exposure assistance information comprises: generating a scheduled report in the event that a periodic scheduling override condition is invalid, wherein the scheduled report is sent when a first time period expires; and generating an unscheduled report in the event that the periodic scheduling override condition is valid, wherein the unscheduled report is sent without waiting for the first time period to expire.

In a twelfth aspect, this specification describes an apparatus comprising: at least one processor; and at least one memory including computer program code which, when executed by the at least one processor, causes the apparatus to: detect a maximum permissible exposure event report; determine whether the detected maximum permissible exposure report is a scheduled report or an unscheduled report; determine whether one or more time periods of the maximum permissible exposure event protocol should be updated in the event that the detected maximum permissible exposure event report is determined to be an unscheduled report, in order to reduce the instances of unscheduled reports; and adjust uplink resources to meet maximum permissible exposure power backoff requirements.

In a thirteenth aspect, this specification describes an apparatus comprising: a maximum permissible exposure event monitor for detecting an occurrence of a maximum permissible exposure event; and an output for reporting maximum permissible exposure assistance information (e.g. to a network node) in response to the so detection of the occurrence of the maximum permissible exposure event, wherein reporting the maximum permissible exposure assistance information comprises: generating a scheduled report in the event that a periodic scheduling override condition is invalid, wherein the scheduled report is sent when a first time period expires; and generating an unscheduled report in the event that the periodic scheduling override condition is valid, wherein the unscheduled report is sent without waiting for the first time period to expire.

In a fourteenth aspect, this specification describes an apparatus comprising: a control module for detecting a maximum permissible exposure event report and determining whether the detected maximum permissible exposure report is a scheduled report or an unscheduled report; a timer module for determining whether one or more time periods of the maximum permissible exposure event protocol should be updated in the event that the detected maximum permissible exposure event report is determined to be an unscheduled report, in order to reduce the instances of unscheduled reports; and resources module for adjusting uplink resources to meet maximum permissible exposure power backoff requirements.

BRIEF DESCRIPTION OF THE DRAWINGS

Example embodiments will now be described, by way of non-limiting examples, with reference to the following schematic drawings, in which.

DETAILED DESCRIPTION

Figure 1:
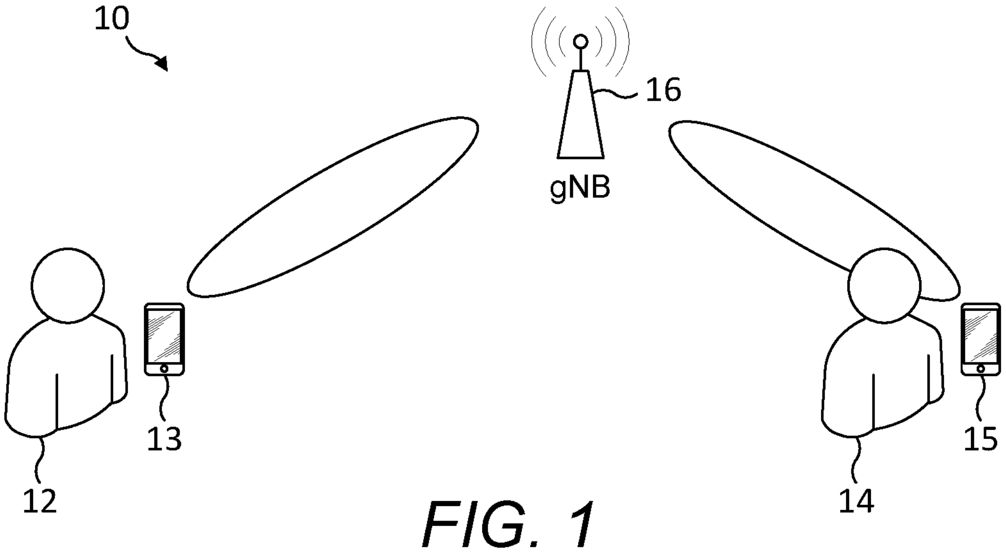
FIG. 1 is a block diagram of a system in accordance with an example embodiment.

The scope of protection sought for various example embodiments of the invention is set out by the independent claims. The example embodiments and features, if any, described in the specification that do not fall under the scope of the independent claims are to be interpreted as examples useful for understanding various embodiments of the invention.

In the description and drawings, like reference numerals refer to like elements throughout.

The millimeter-wave (mmW) spectrum offers the possibility of using large portions of contiguous bandwidth to enable mobile communication systems to provide high-throughput applications. The 5th Generation (5G) New Radio (NR) frequency spectrum extends well-above the previous 4th Generation (4G) spectrum, which was ranging from 400 MHz to 6 GHz—otherwise known as Frequency Range 1 (FR1). In mmWave 5G NR, Frequency Range 2 (FR2) comprises the frequencies between 24 GHz and 52 GHz; and extending the NR operation into the 52-114 GHz range is currently being discussed.

Operating at such high frequencies with high gain antennas has raised concerns for the health of users. There is a standard on millimeter-wave regime that specifies and regulates the maximum power for the user equipment (UE). Since frequencies below 100 GHz are non-ionizing, the concern for health is limited to thermal heating of the body tissue while absorbing electromagnetic mmW energy. Millimeter-wave frequencies yield penetration depths below 1 mm, therefore possible thermal damage is limited to the surface of the skin and the eyes; indeed, most of the energy is absorbed within the first 0.4 mm of the human skin at 42 GHz.

Governmental exposure guidelines are in place to prevent health issues due to thermal effects. Below 6 GHz, Specific Absorption Rate (SAR) has been used to determine the exposure threshold. SAR measures the energy absorbed by the human body when exposed to electromagnetic fields. The SAR limitation in the U.S. is 1.6 W/kg averaged over 1-g tissue from FCC, while in Europe it is 2 W/kg averaged over 10-g tissue. The 1-g averaging provides a finer resolution for the study of energy absorption in the human body.

Nonetheless, for millimetre-wave regimes where the penetration depth is below 1 mm, even 1-g tissue is in fact a rather large volume. Being difficult to define a meaningful volume for SAR evaluation, it has been commonly accepted to use Power Density (PD) and not SAR to set the restrictions on exposure at millimeter-wave frequencies. It is thus a planar energy distribution as opposed to a volumetric one. Maximum Permissible Exposure (MPE) is a regulation based on PD for the millimeter-wave regime. The FCC and ICNIRP set the threshold for MPE at 10 $W/m^2$ (1 $mW/cm^2$), for the general public, between 6 or 10 GHz respectively and 100 GHz. The energy absorbed by the human body increases as a function of the distance to the UE. Therefore, to comply with the MPE limit, the UE may reduce its output power if the user gets in close vicinity of the antenna.

FIG. 1 is a block diagram of a system, indicated generally by the reference numeral 10, in accordance with an example embodiment. In the system 10, a first user 12 is using a first mobile communication device (UE) 13 to communicate with a network node (gNB) 16 and a second user 14 is using a second mobile communication device (UE) 15 to communicate with the network node 16.

As shown in FIG. 1, communications between the first device 13 and the network node 16 occur via an unobstructed Line of Sight (LOS) path, whereas the second user 14 stands at least partially in the path of a beam from the second device 15 to the network node 16.

Thus, the second user is exposed to a radiated beam between the second device 15 and the network node 16. As the user comes in close vicinity of the second device 15, the amount of energy absorbed by the user's body may be relatively large; as such the output power of the second device 15 may need to be reduced to comply with MPE requirements.

Figure 2:
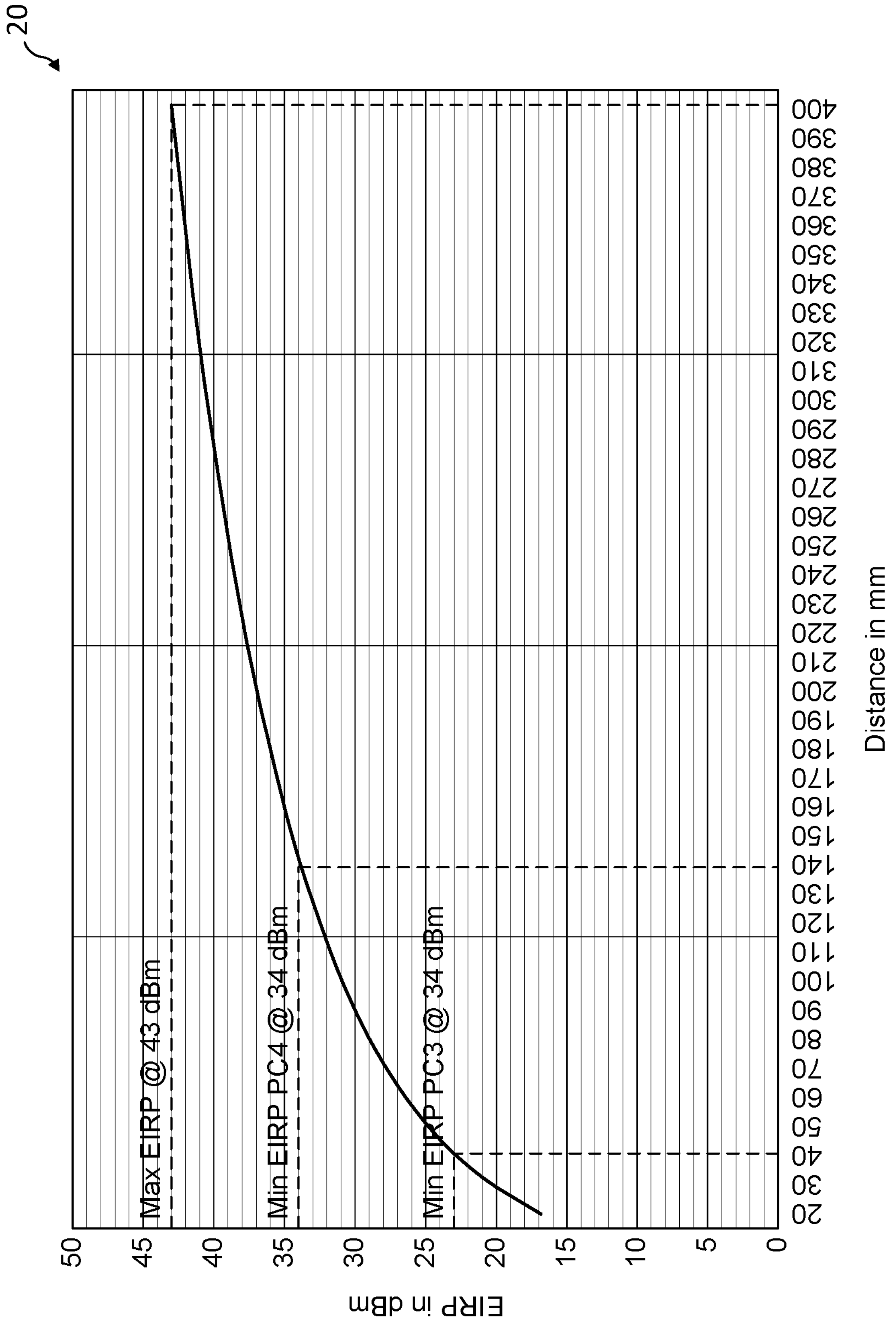
FIG. 2 is a graph showing example exposure rates.

FIG. 2 is a graph, indicated generally by the reference numeral 20, showing maximum allowed equivalent isotropically radiated power (EIRP) depending on the distance between a user device (e.g. an antenna of the user device) and a user. As is clearly shown in the example graph 20, the maximum allowed EIRP reduces as the distance between the user device and the user is reduced.

Figure 3:
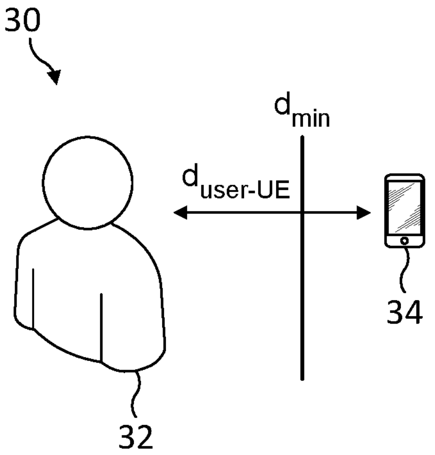
FIGS. 3 and 4 are block diagrams of systems in accordance with example embodiments.

FIG. 3 is a block diagram of a system 30 in accordance with an example embodiment. The system 30 comprises a user 32 (similar to the users 12 and 14 described above) and a user device 34 (similar to the user devices 13 and 15 described above). In the system 30, the user 32 and the user device 34 are separated by a distance $d_{user\text{-}UE}$ that is greater than a minimum safety distance $d_{min}$.

Figure 4:
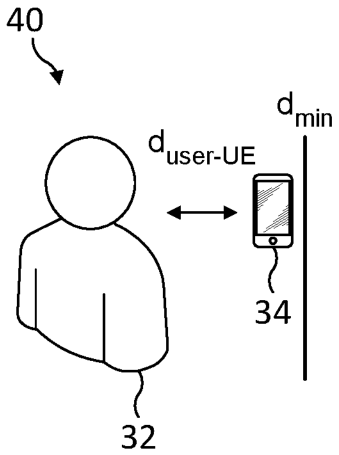

FIG. 4 is a block diagram of a system 40, indicated generally by the reference numeral 40, in accordance with an example embodiment. The system 40 comprises the user 32 and the user device 34 described above with reference to FIG. 3. However, in the system 40, the user 32 and the user device 34 are separated by a distance $d_{user\text{-}UE}$ that is less than a minimum safety distance $d_{min}$.

When the distance between the user 32 and the user device 34 goes below the minimum safety distance $d_{min}$, then the user device is required to perform a power back-off in order to meet the MPE regulation requirements. This back-off is referred to herein as an MPE event.

Figure 5:
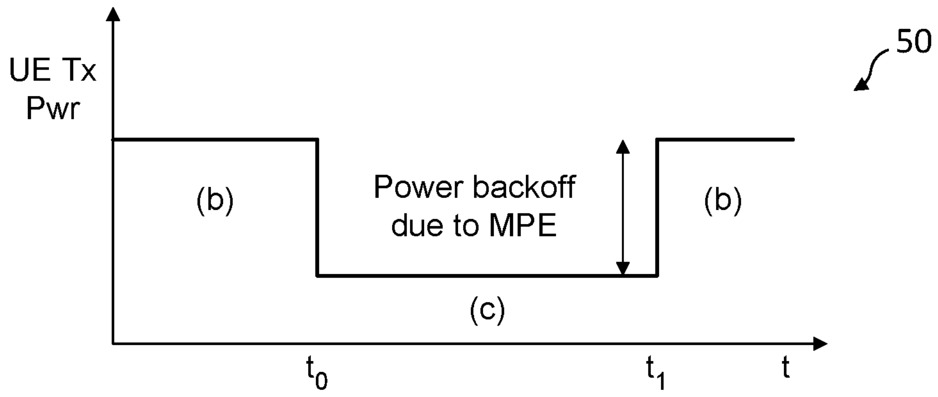
FIG. 5 is a plot showing an example power back-off feature.

FIG. 5 is a plot, indicated generally by the reference numeral 50, showing an example power back-off feature. The plot shows a user device transmit power (on the y-axis) plotted against time. As shown in the plot 50, the user device transmit power is reduced between times $t_0$ and $t_1$ (due to an MPE event). The user device transmit power may be reduced, for example, by reducing a duty cycle of uplink transmissions.

In the event that the user device 32 is communicating with a network element (such as the network node 16 described above) when a power back-off occurs, it is possible that the network node may be unable to receive enough power from the uplink transmission from the user device in order to decode successfully the transmitted payload from the user device. This may be the case, for example, since the link adaptation (e.g. the selection of MCS, TBS and UL transmission power) may have been performed when the user device was at a position above the $d_{min}$ MPE triggering distance. Depending on the duration of the MPE event, a radio link failure (RLF) might also be triggered, resulting in disruption to a user experience and requiring the user device to reconnect to the relevant network (e.g. transition again to an RRC connected state).

Figure 6:
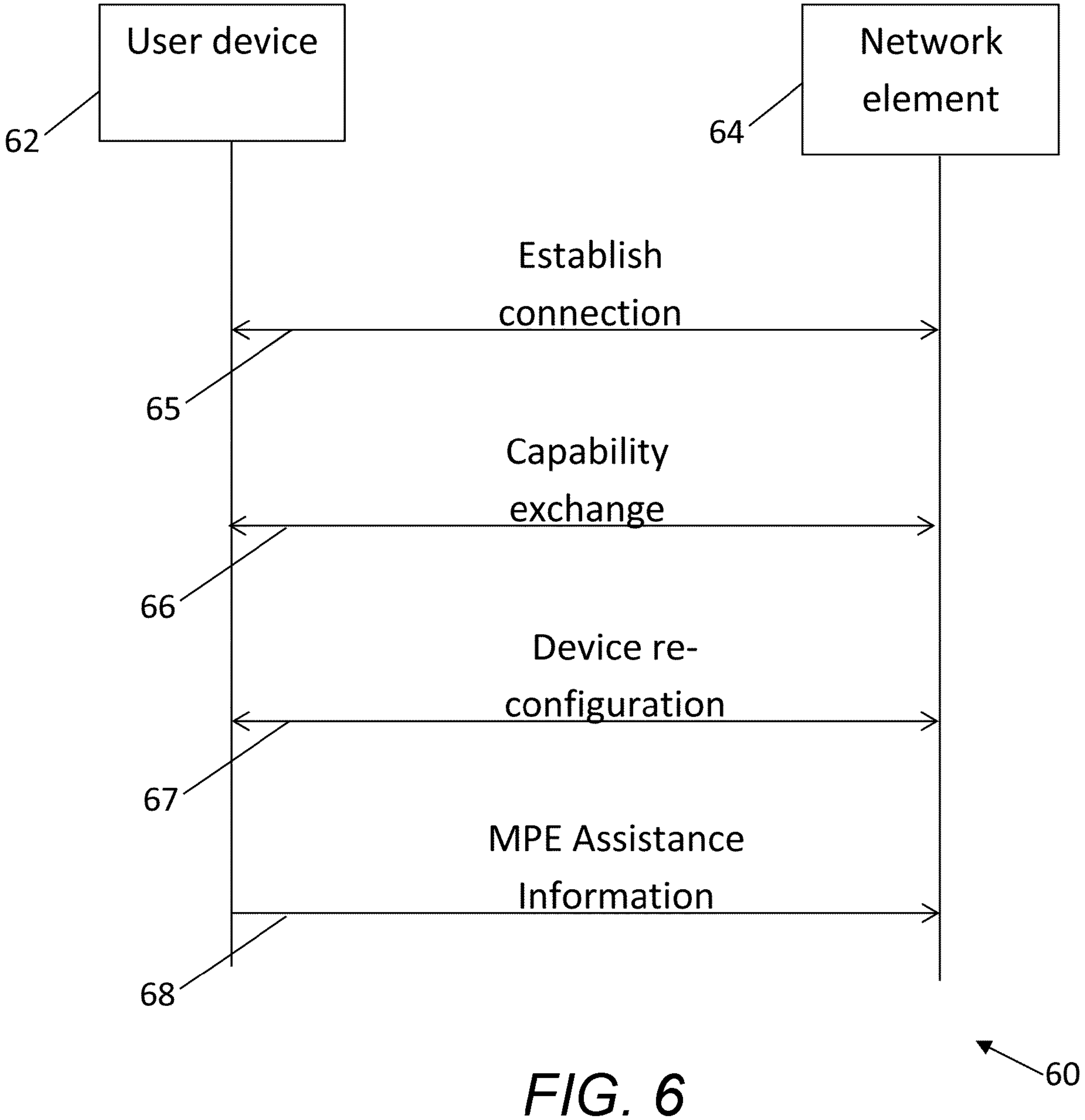
FIG. 6 is a message sequence in accordance with an example embodiment.

FIG. 6 is a message sequence, indicated generally by the reference numeral 60, in accordance with an example embodiment. The message sequence shows messages between a user device 62 (such as the user device 13, 15 or 34 described above) and a network element 64 (such as the network node 16 described above) that enables the user device 62 to inform the network element 64 of the occurrence of an MPE event. The message sequence 60 comprises establish connection messages 65, capability exchange messages 66, device re-configuration messages 67 and MPE assistance information 68. As discussed further below, the MPE assistance information 68 may be used to report the occurrence of an MPE event.

The message sequence 60 may be implemented using Radio Resource Control (RRC) protocols, as discussed further below.

The message sequence 60 starts with establish connection messages 65 in which the user device 62 establishes a connection with the network element 64. For example, the user device 62 may transition from a radio resource control (RRC) idle or inactive state to an RRC connected state.

The establish connection messages 65 are followed by capability exchange messages 66 in which the user device 62 informs the network element 64 of its capabilities, typically in response to requests for such information from the network element. In the context of the example embodiments described herein, the user device 62 informs the network element 64 that it is capable of providing MPE related UE assistance as part of the capability exchange messages 66.

Using the device re-configuration messages 67 (RRC reconfiguration), the network element 64 configures the users device 62 to be able to report the MPE related UE assistance. This configuration may include details such as how often the user device 62 is allowed to perform this reporting (e.g. the range of allowable periodicity). For example, a long periodicity may be preferred in order to minimize signaling overhead. Alternatively, a small periodicity may be preferred to enable the network to react quickly (e.g. to adjust power back-off at the user device quickly). The re-configuration messages may be in accordance with existing RRC reconfiguration protocols.

Finally, upon detecting the occurrence of an MPE event, the user device 62 transmits to the network its MPE Assistance Information as part of the MPE assistance information message 68. As discussed in detail below, the transmission of the MPE event report timing may depends on the severity of the MPE conditions.

Figure 7:
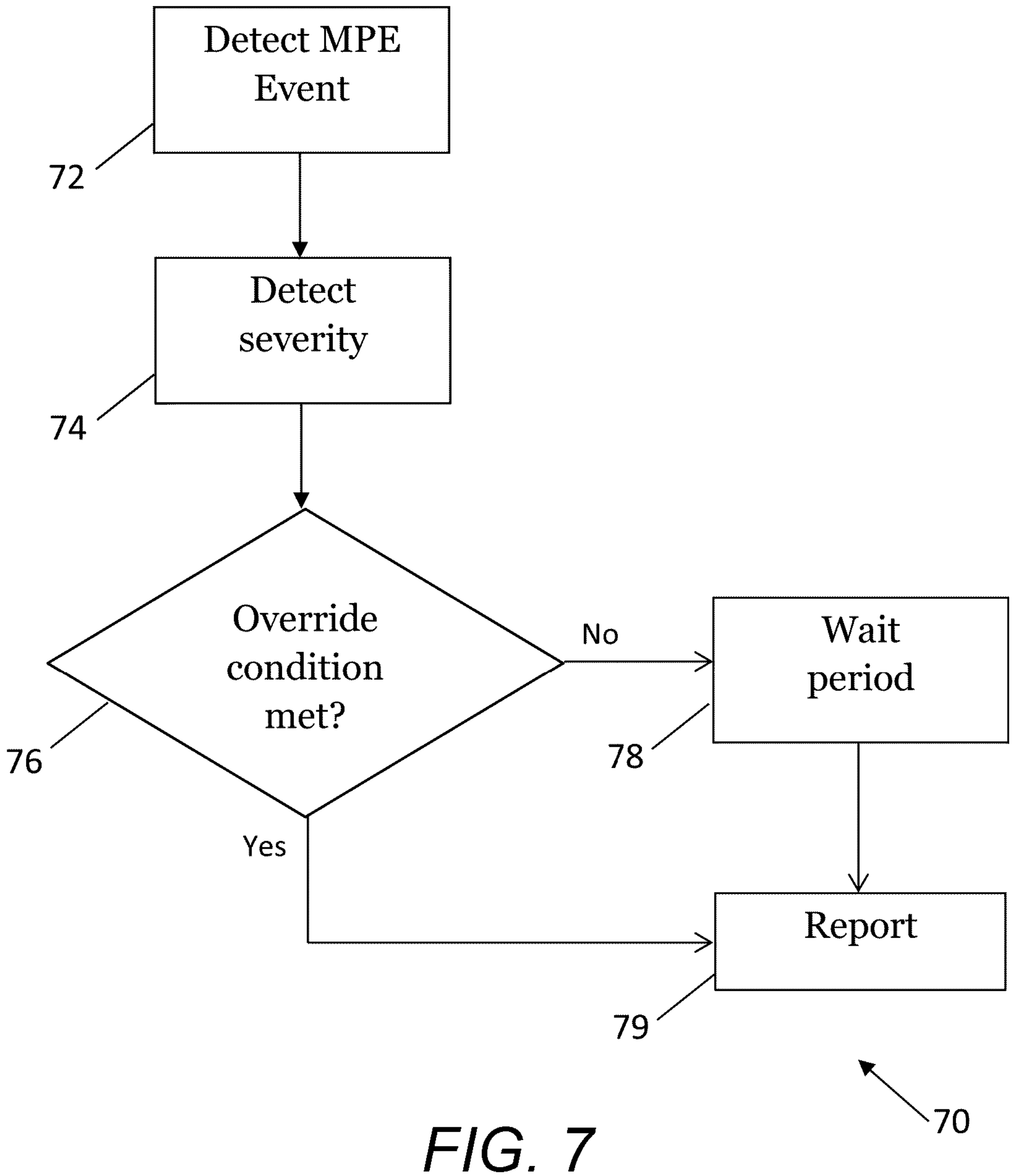
FIG. 7 is a flow chart showing an algorithm in accordance with an example embodiment.

FIG. 7 is a flow chart showing an algorithm, indicated generally by the reference numeral 70, in accordance with an example embodiment.

The algorithm 70 starts at operation 72, where the occurrence of a maximum permissible exposure (MPE) event is detected. At operation 74, a severity of a detected MPE event is determined or otherwise detected.

At operation 76, a determination is made regarding whether an override condition (e.g. a periodic scheduling override condition) is met. An override condition may, for example, relate to a severity of the detected MPE event. The severity may be linked to the extent to which a transmit (uplink) duty-cycle needs to be reduced in order to overcome the MPE event. Alternatively, or in addition, the severity may be linked to the extent to which power back-off is required in order overcome the MPE event.

If operation 76 determines that the override condition is not met (e.g. if the severity of the MPE event is below a threshold level), then the algorithm 70 moves to a wait state 78. After the expiry of the wait state, then an MPE report (referred to below as a scheduled MPE report) is generated at operation 79.

If operation 76 determines that the override condition is met, then the algorithm 70 moves to operation 79, such that an MPE report is generated without waiting for the expiry of the wait state described above (referred to below as an unscheduled MPE report).

Thus, the algorithm 70 enables reporting of maximum permissible exposure assistance information (e.g. to a network element, such as the network element 64) in response to the detection of the occurrence of the maximum permissible exposure event. Moreover, the reporting of the maximum permissible exposure assistance information includes: generating a scheduled report in the event that the override condition is not met (e.g. is invalid) and generating an unscheduled report in the event that the override condition so is met (i.e. is valid).

As discussed further below, a scheduled report may be sent when a first time period expires, whereas an unscheduled report may be sent without waiting for the first time period to expire.

Figure 8:
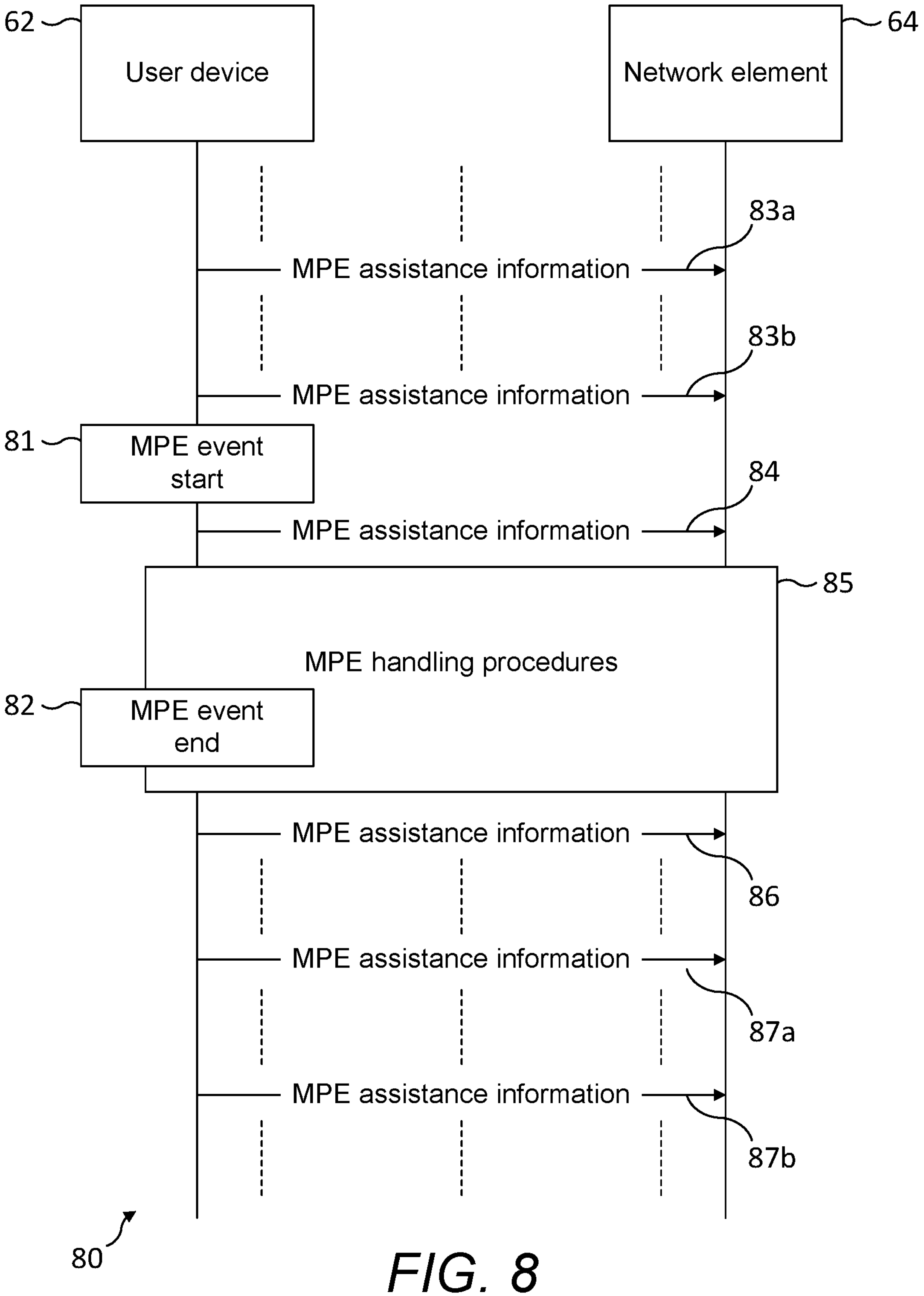
FIG. 8 is a message sequence in accordance with an example embodiment.

FIG. 8 is a message sequence, indicated generally by the reference numeral 80, in accordance with an example embodiment. The message sequence 80 shows messages between the user device 62 and the network element 64 described above that enables the user device 62 to inform the network element 64 of the occurrence of an MPE event. The messages sequence 80 shows details of an example implementation of the MPE assistance information message 68 described above.

The message sequence 80 shows the detection of an MPE event 81 at the user device 62 and the detection of the end of an MPE event 82 at the user device. The message sequence 80 shows how this information is communicated to the network element 64 in the event that the override condition of operation 76 of the algorithm 70 is not met (e.g. the MPE event is not considered to be severe).

As discussed further below, in circumstances when an MPE event is not considered to be severe, then MPE assistance information is sent at the expiry of a time period (e.g. a timer). Thus, MPE assistance information messages may be sent periodically.

The message sequence 80 includes a first potential MPE assistance information message 83*a* and a second potential MPE assistance information message 83*b*, both of which occur before the start of the MPE event 81. Since no MPE event is detected at these times, no MPE information is required to be sent in the potential messages 83*a* and 83*b*. Those potential message slots may simply be omitted; alternatively, a blank message may be sent, indicating that no MPE event has been detected.

Following the detection of the MPE event 81, an MPE assistance information message 84 is sent from the user device 62 to the network element 64. Since the MPE event 81 is deemed to not be severe, the MPE assistance information message 84 is sent at the next available one of the periodic potential MPE assistance information messages.

In response to the receipt of the MPE assistance information 84, MPE handling procedures 85 are enacted. The MPE handling procedures 85 may include means for triggering a power backoff in response to the maximum permissible exposure event in order to meet MPE regulation requirements. As discussed further below, the power backoff procedures may include changes to the uplink resources provided for the user device 62 to communicate with the network element 64 in order to meet the MPE requirements.

Once the end of the MPE event 82 is detected, an MPE assistance information message 86 is sent from the user device to the network element 64, for example at the next periodic message slot indicating the end of the MPE event.

The message sequence 80 includes further potential MPE assistance information messages 87*a* and 87*b*, both of which occur after then end of the MPE event. Following the message 86, no further MPE event is detected and so no MPE information is required to be sent in the potential messages 87*a* and 87*b*. As noted above, those potential message slots may simply be omitted; alternatively, a blank message may be sent, indicating that no MPE event has been detected.

Figure 9:
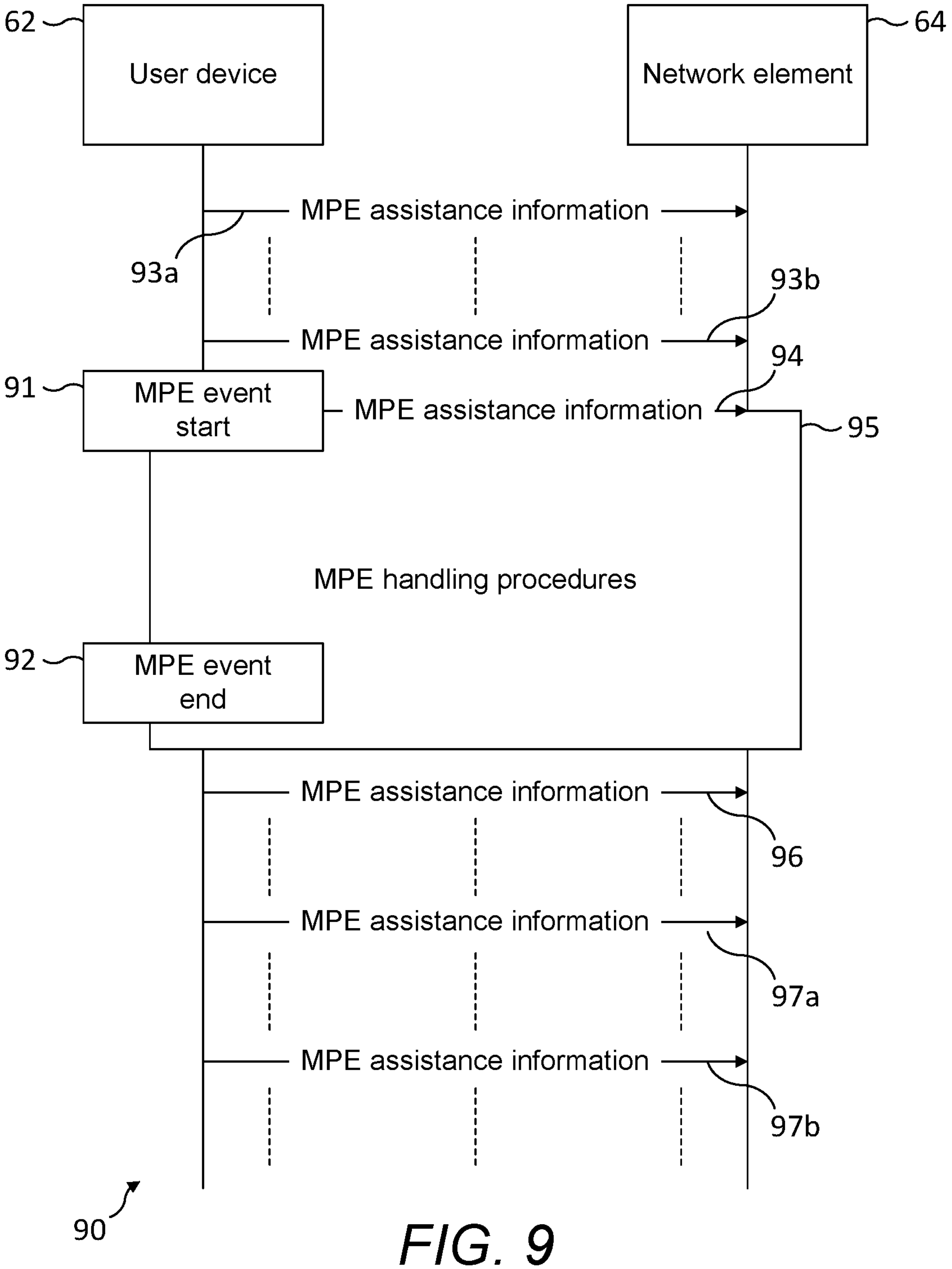
FIG. 9 is a message sequence in accordance with an example embodiment.

FIG. 9 is a message sequence, indicated generally by the reference numeral 90, in accordance with an example embodiment. The message sequence 90 shows messages between the user device 62 and the network element 64 described above that enables the user device 62 to inform the network element 64 of the occurrence of an MPE event. Thus, in common with the message sequence 80, the messages sequence 90 shows details of an example implementation of the MPE assistance information message 68 described above.

The message sequence 90 shows the detection of an MPE event 91 at the user device 62 and the detection of the end of an MPE event 92 at the user device. The message sequence 90 shows how this information is communicated to the network element 64 in the event that the override condition of operation 76 of the algorithm 70 is met (e.g. the MPE event is considered to be severe).

As discussed further below, in circumstances when an MPE event is considered to be severe, then MPE assistance information is sent without waiting for the expiry of a time period (e.g. a timer).

The message sequence 90 includes a first potential MPE assistance information message 93*a* and a second potential MPE assistance information message 93*b*, both of which occur before the start of the MPE event 91. Since no MPE event is detected at these times, no MPE information is required to be sent in the potential messages 93*a* and 93*b*. Those potential message slots may simply be omitted; alternatively, a blank message may be sent, indicating that no MPE event has been detected.

Following the detection of the MPE event 91, an MPE assistance information message 94 is sent from the user device 62 to the network element 64. Since the MPE event 91 is deemed to be severe, the MPE assistance information message 94 is sent without wait for the next available one of the periodic potential MPE assistance information messages.

In response to the receipt of the MPE assistance information 94, MPE handling procedures 95 are enacted. The MPE handling procedures are similar to the MPE handling procedures 85 discussed above; for example, the MPE handling procedures 95 may include changes to the uplink resources provided for the user device 62 to communicate with the network element 64 in order to meet the MPE requirements.

Once the end of the MPE event 92 is detected, an MPE assistance information message 96 is sent from the user device to the network element 64, for example at the next periodic message slot indicating the end of the MPE event.

The message sequence 90 includes further potential MPE assistance information messages 97*a* and 97*b*, both of which occur after then end of the MPE event. Following the message 96, no further MPE event is detected and so no MPE information is required to be sent in the potential messages 97*a* and 97*b*. As noted above, those potential message slots may simply be omitted; alternatively, a blank message may be sent, indicating that no MPE event has been detected.

Figure 10:
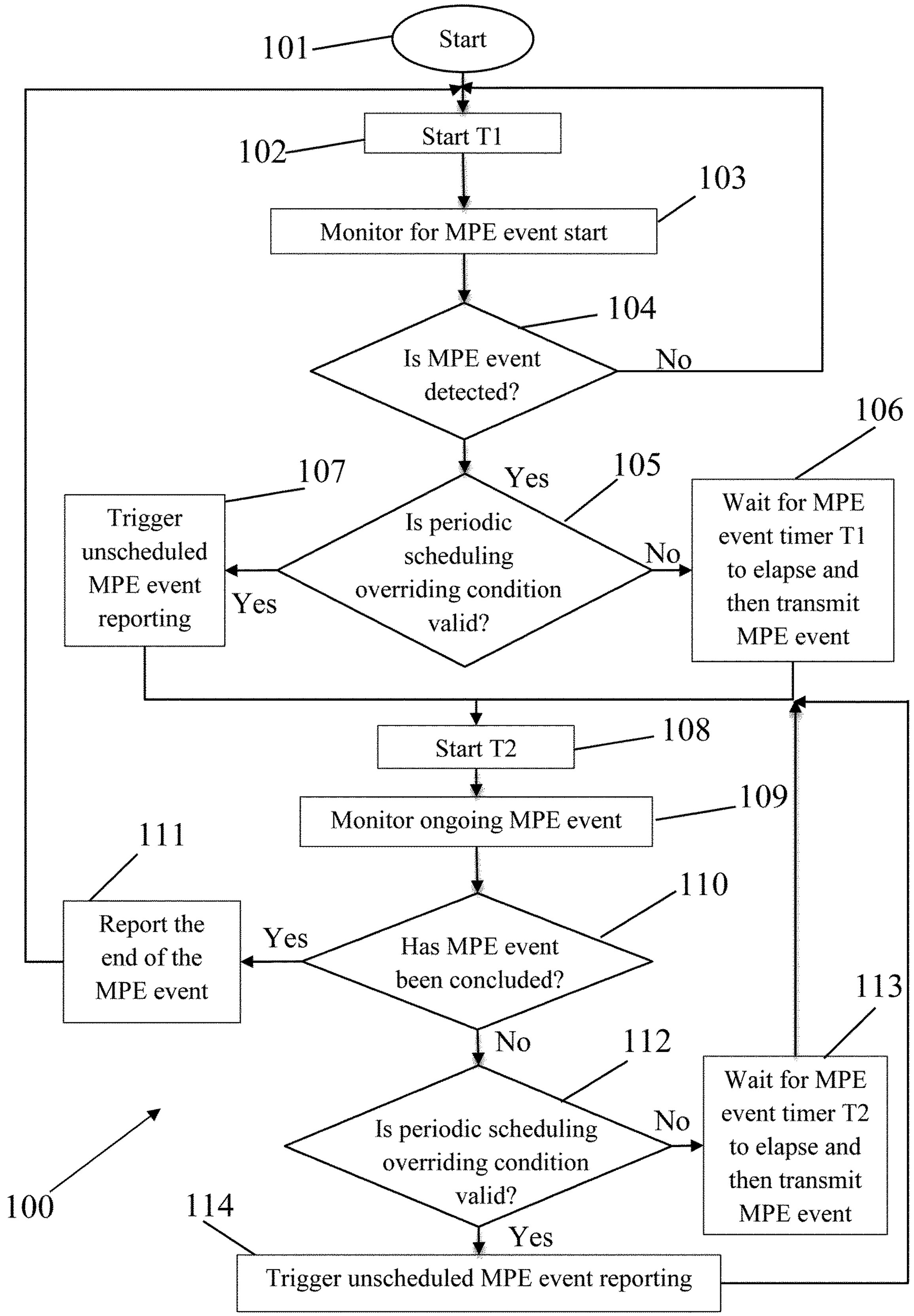
FIG. 10 is a flow chart showing an algorithm in accordance with an example embodiment.

FIG. 10 is a flow chart showing an algorithm, indicated generally by the reference numeral 100, in accordance with an example embodiment. The algorithm 100 is initiated at operation 101. The algorithm 100 may be implemented at the user device 62 (or some similar user device). In some example embodiments, multiple instances of the algorithm 100 may be implemented at each of a plurality of user devices.

At operation 102, a first timer T1 is initiated (e.g. at the user device 62 described above). The first timer T1 is associated with the periodic reporting of MPE events.

At operation 103, the user device 62 starts monitoring for the start of an MPE event. This may be an internal user device process and may be implemented in many different ways. For example, proximity sensors may be provided to determine the presence of a user close to the user device or radar-based or similar detection methods may be provided.

At operation 104, the user device 62 determines whether an MPE event (such as the start of the MPE events 81 or 91 described above) has been detected. If an MPE event is detected, the algorithm 100 moves to operation 105. If an MPE event is not detected, the algorithm 100 returns to operation 102.

At operation 105, the user device 62 determines whether a periodic scheduling overriding condition is valid. As discussed elsewhere herein, a periodic scheduling override condition may be valid in the event that the MPE event is deemed to be severe. If the periodic scheduling override condition is not valid, then the algorithm 100 moves to operation 106. If the periodic scheduling override condition is valid, then the algorithm 100 moves to operation 107.

Example implementations of the operation 105 include considering a duty cycle threshold or a power back-off threshold. For example, the overriding condition may be met if a duty cycle reduction required due to the MPE event is below a duty cycle threshold level (e.g. 20%) due to the MPE event. Alternatively, or in addition, the overriding condition may be met if a power back-off required due to the MPE event is above a threshold level (e.g. a given dB level).

Alternatively, or in addition, the operation 105 may consider a flag that may be set to override periodic reporting. For example, user device 62 or a control module may be allowed to set a flag to override the periodic reporting (e.g. when the required duty cycle reduction is not achievable if the UE waits until the timer T1 elapses).

Thus, the operation 105 may include determining a severity of the detected maximum permissible exposure event. The operation 105 may include setting the periodic scheduling override condition to be valid in the event that the detected maximum permissible exposure event is determined to have a high severity.

At operation 106, the user device 62 waits for the timer T1 to lapse and then transmits the MPE event report. Thus, the operation 106 results in a periodic MPE report being transmitted (as discussed above with reference to the message sequence 80). The algorithm 100 then moves to operation 108.

At operation 107, the user device 62 triggers the transmission of the MPE event reporting, without waiting for the timer T1 to lapse (as discussed above with reference to the message sequence 90). The algorithm 100 then moves to operation 108.

At operation 108, a second timer T2 is set. The first timer T1 and the second timer T2 may have the same duration or different durations; for example, the second timer duration may be shorter than the first. The timers may be two instances of the same timer or may be separate timers.

At operation 109, the user device 62 monitors the ongoing MPE event. Then, at operation 110, a determination is made regarding whether or not the MPE event has concluded. For example, a determination may be made regarding whether the distance between the user device 62 and a user is above the $d_{min}$ distance discussed above. The operation 110 may determine that the MPE event has ended in the event that the maximum permissible exposure event ends before a period of the second timer expires.

If it is determined in operation 110 that the MPE event has concluded, the algorithm 100 moves to operation 111; otherwise, the algorithm 100 moves to operation 112.

At operation 111, the end of the MPE event is reported (e.g. by the user device 62 to the network element 64). The operation 111 may be implemented, for example, by the message 86 of the message sequence 80 or the message 96 of the message sequence 90 described above. Once the end of the MPE has been reported, the algorithm 100 returns to operation 102.

At operation 112 (where it is determined that the MPE event is going), the user device 62 determines whether a periodic scheduling overriding condition is valid. As discussed with reference to operation 105, a periodic scheduling override condition may be valid in the event that the MPE event is deemed to be severe. If the periodic scheduling override condition is not valid, then the algorithm 100 moves to operation 113. If the periodic scheduling overriding condition is valid, then the algorithm 100 moves to operation 114.

Example implementations of the operation 112 include considering a duty cycle threshold, a power back-off threshold or a flag. The overriding condition in operation 112 may be the same as the condition in operation 105, but this is not essential. For example, the overriding condition in operation 112 may be stricter than the condition in operation 105 or stricter than the actual condition of the user device at that time, thereby determining whether or not the MPE event is getting worse (e.g. is the user device 62 moving closer to the user).

At operation 113, the user device 62 waits for the second timer T2 to lapse and then transmits the MPE event report. Thus, the operation 113 results in a periodic MPE report being transmitted. The algorithm 100 then returns to operation 108.

At operation 114, the user device 62 triggers the transmission of the MPE event reporting, without waiting for the second timer T2 to lapse. The algorithm 100 then returns to operation 108.

Figure 11:
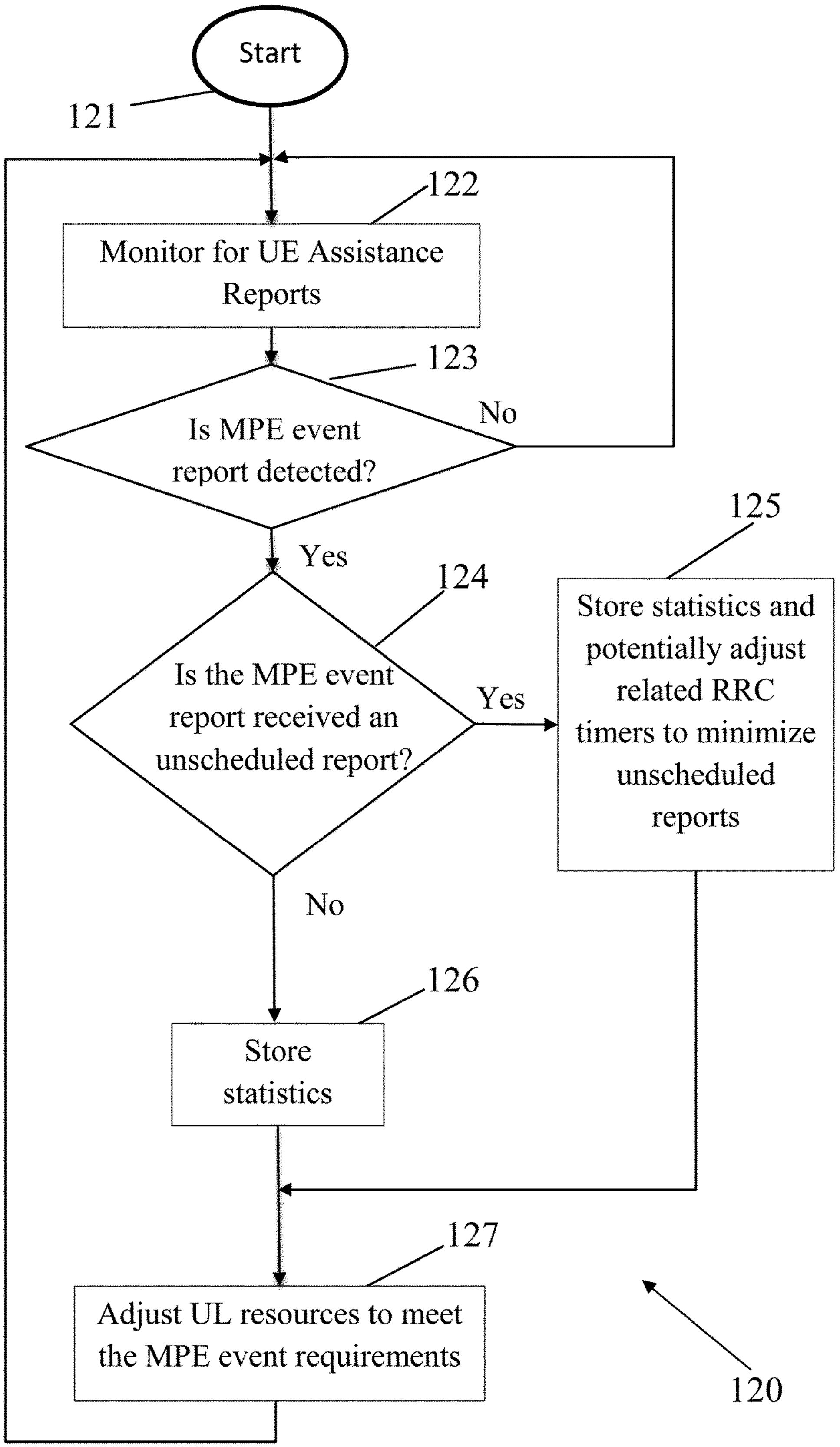
FIG. 11 is a flow chart showing an algorithm in accordance with an example embodiment.

FIG. 11 is a flow chart showing an algorithm, indicated generally by the reference numeral 120, in accordance with an example embodiment. The algorithm 120 is initiated at operation 121. The algorithm 120 may be implemented at the network element 64 (or some similar node).

At operation 122, the network element 64 monitors for the reception of a UE assistance report from a user device (such as the user device 62). At operation 123, on detection of a UE assistance report, a determination is made (e.g. at the network element 64) regarding whether the received UE Assistance report is an MPE event report (e.g. a message such as the messages 84 or 94 described above).

If a received MPE event report is detected at operation 123, then the algorithm 120 moves to operation 124; otherwise, the operation 120 returns to operation 122.

At operation 124, the network element 64 determines whether the received report follows the current expected periodicity (i.e. T1 for the case of MPE event detection or T2 for the case of an ongoing MPE event). If not, the received MPE report is identified as an unscheduled report and the algorithm 120 moves to operation 125. Otherwise, the received MPE report is identified as a scheduled report and the algorithm 120 moves to operation 126.

At operation 125, information is extracted (e.g. at the network element 64) about the user device triggering the unscheduled report and this information is used to create statistics. Such MPE event statistics may be generated and stored on receipt of an MPE event report. Moreover, one or more time periods (e.g. timers) of the MPE event protocol may be updated, in order to reduce the instances of unscheduled reports. By way of example, the timers (or time periods) may be updated using machine learning algorithms.

By way of example, the values associated with the first and/or the second timers described above may be adjusted. It should be noted that, in certain cells (or even for individual users), the occurrence of MPE events will be different. For example, a specific user might regularly hold the user deice close to their head in a talk mode, while another one might consistently use a headset with the user device placed on a surface away from the user. In the latter case it is expected that fewer MPE events will occur and as such the T1 and T2 timers can be more relaxed.

At operation 126, information is extracted (e.g. at the network element 64) about the user device triggering the scheduled report and this information is used to create statistics. Such MPE event statistics may be generated and stored on receipt of an MPE event report.

At operation 127, the uplink resources of the user device 62 are adjusted, for example to meet the MPE power back-off requirements. In one example embodiment, an uplink duty cycle may be modified in the operation 127.

The uplink resources may also be modified by defining a first timer start time for a particular user device, wherein said scheduled report is sent by said user device to said apparatus in the event of the expiry of said first timer. Moreover, the first timer start time may be set to be different for different user devices, such that the first timers (and so hence the scheduled reports) are staggered.

Figure 12:
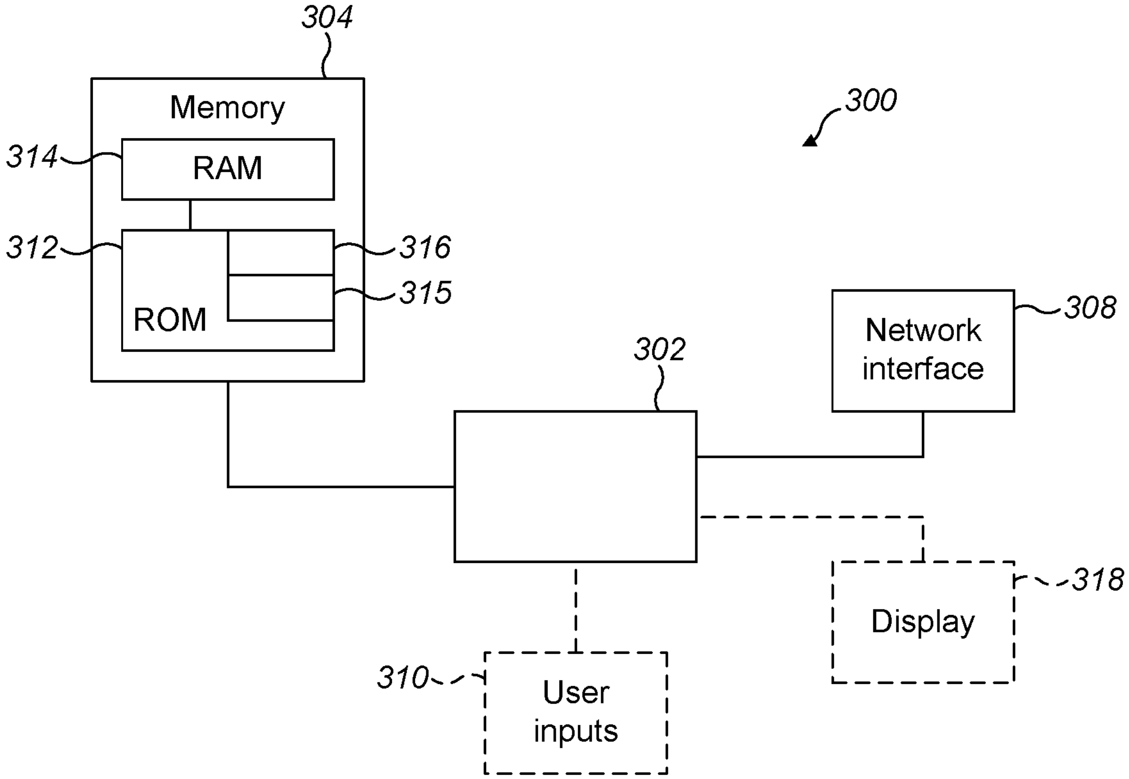
FIG. 12 is a block diagram of components of a system in accordance with an example so embodiment.

For completeness, FIG. 12 is an example schematic diagram of components of one or more of the modules for implementing the algorithms described above, which hereafter are referred to generically as processing systems 300. A processing system 300 may have a processor 302, a memory 304 coupled to the processor and comprised of a RAM 314 and ROM 312, and, optionally, user inputs 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithms and message sequences 60, 70, 80, 90, 100 and 120.

The processor 302 may take any suitable form. For instance, it may be a microcontroller, plural microcontrollers, a processor, or plural processors. Processor 302 may comprise processor circuitry.

The processing system 300 may be a standalone computer, a server, a console, or a network thereof.

In some example embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 13A:
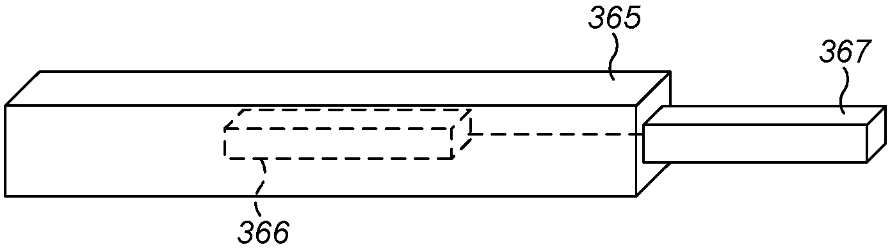
FIGS. 13A and 13B show tangible media, respectively a removable non-volatile memory unit and a Compact Disc (CD) storing computer-readable code which when run by a computer perform operations according to example embodiments.
Figure 13B:
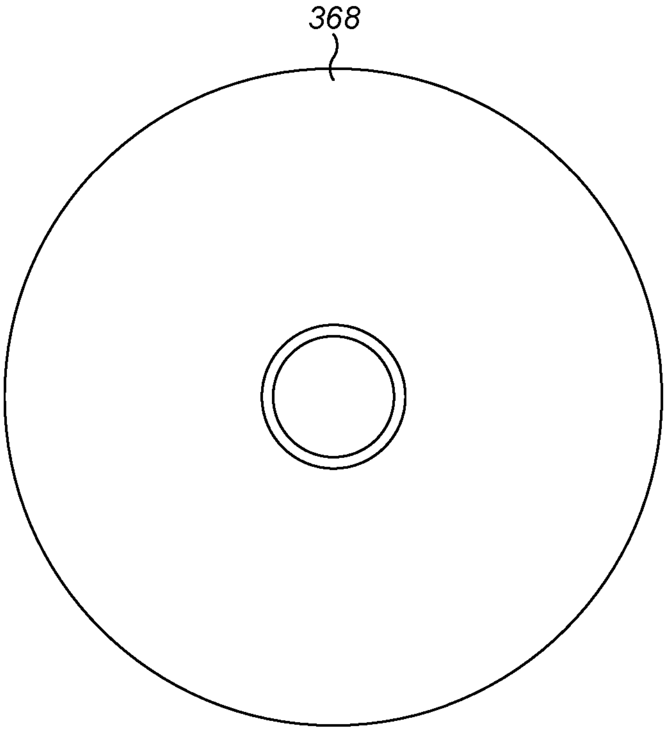

FIG. 13A and FIG. 13B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Some example embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform so various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 6 to 11 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

Example embodiments described herein may be implemented as part of an existing RRC protocol (such as the specification TS38.311: Radio Resource Control protocol specification).

In the following, we introduce the text that needs to be added into TS 38.331 to enable this functionality. We highlight with underlinings the new added functionality.

The invention claimed is:

1. A user device, comprising:

at least one processor; and at least one memory storing instructions that, when executed by the at least one processor, cause the user device to:

detect an occurrence of a maximum permissible exposure event;

report, to a network element, maximum permissible exposure assistance information in response to the detection of the occurrence of the maximum permissible exposure event, wherein to report the maximum permissible exposure assistance information the user device is caused to:

generate a scheduled report of the maximum permissible exposure assistance information in the event that a periodic scheduling override condition is invalid, wherein the scheduled report is sent when a first time period expires, and generate an unscheduled report of the maximum permissible exposure assistance information in the event that the periodic scheduling override condition is valid, wherein the unscheduled report is sent without waiting for the first time period to expire;

determine a severity of the detected maximum permissible exposure event; and set the periodic scheduling override condition to be valid in the event that the detected maximum permissible exposure event is determined to have a high severity.

2. The user device as claimed in claim 1, wherein the detected maximum permissible exposure event is determined to have a high severity in the event that a duty cycle reduction required to address said exposure event is above a threshold.

3. The user device as claimed in claim 2, wherein the user device is further caused to monitor an ongoing maximum permissible exposure event.

4. The user device as claimed in claim 1, wherein the user device is further caused to monitor an ongoing maximum permissible exposure event.

5. The user device as claimed in claim 4, wherein the user device is further caused to report that the maximum permissible exposure event has ended in the event that the maximum permissible exposure event ends before a second time period expires.

6. The user device as claimed in claim 1, further comprising a first timer for monitoring said first time period.

7. The user device as claimed in claim 1, wherein the user device is further caused to indicate that the apparatus is capable of providing maximum permissible exposure assistance information.

8. The user device as claimed in claim 1, wherein the user device is further caused to trigger a power backoff in response to the maximum permissible exposure event.

9. The user device as claimed in claim 8, wherein the user device is further caused to trigger a duty cycle adjustment in response to the maximum permissible exposure event.

10. The user device as claimed in claim 1, wherein the operations further include triggering a duty cycle adjustment in response to the maximum permissible exposure event.

11. A method comprising:

detecting, by a user device operating in a network, an occurrence of a maximum permissible exposure event;

reporting, to an element in the network, maximum permissible exposure assistance information in response to the detection of the occurrence of the maximum permissible exposure event, wherein reporting the maximum permissible exposure assistance information comprises:

generating a scheduled report of the maximum permissible exposure assistance information in the event that a periodic scheduling override condition is invalid, wherein the scheduled report is sent when a first time period expires, and generating an unscheduled report of the maximum permissible exposure assistance information in the event that the periodic scheduling override condition is valid, wherein the unscheduled report is sent without waiting for the first time period to expire; and determining a severity of the detected maximum permissible exposure event and setting the periodic scheduling override condition to be valid in the event that the detected maximum permissible exposure event is determined to have a high severity.

12. A method as claimed in claim 11, further comprising monitoring an ongoing maximum permissible exposure event and reporting that the maximum permissible exposure event has ended in the event that the maximum permissible exposure event ends before a second time period expires.

13. A computer program product having a series of operating instructions stored on a non-transitory computer-readable medium that directs a data processing apparatus when executed thereby to perform operations comprising the steps of claim 11.

14. The method as claimed in claim 11, wherein the detected maximum permissible exposure event is determined to have a high severity in the event that a duty cycle reduction required to address said exposure event is above a threshold.

15. The method as claimed in claim 14, further comprising monitoring an ongoing maximum permissible exposure event.

16. The method as claimed in claim 11, further comprising monitoring an ongoing maximum permissible exposure event.

17. The method as claimed in claim 11, further comprising monitoring said first time period.

18. The method as claimed in claim 11, further comprising indicating that the apparatus is capable of providing maximum permissible exposure assistance information.

19. The method as claimed in claim 11, further comprising triggering a power backoff in response to the maximum permissible exposure event.

20. The method as claimed in claim 11, further comprising triggering a duty cycle adjustment in response to the maximum permissible exposure event.

* * * * *